United States Patent [19]
Lewis

[11] 3,776,626
[45] Dec. 4, 1973

[54] FILM ADVANCING AND POSITIONING APPARATUS

[75] Inventor: John Hopkins Lewis, Teaneck, N.J.

[73] Assignee: Columbia Pictures Industries, Inc., New York, N.Y.

[22] Filed: Feb. 15, 1972

[21] Appl. No.: 226,436

[52] U.S. Cl. ................................. 352/194, 226/55
[51] Int. Cl. ............................................. G03b 1/22
[58] Field of Search.................... 352/191, 192, 193, 352/194, 195, 196; 226/55, 57, 58

[56] References Cited
UNITED STATES PATENTS

| | | | |
|---|---|---|---|
| 2,046,844 | 7/1936 | Proctor | 226/55 |
| 1,631,570 | 6/1927 | Amet | 352/192 |
| 1,038,586 | 9/1912 | Howell | 226/55 |
| 3,471,228 | 10/1969 | Martin | 352/191 |
| 3,473,874 | 10/1969 | Hall | 355/52 |

Primary Examiner—Monroe H. Hayes
Attorney—Joseph M. Fitzpatrick et al.

[57] ABSTRACT

Optical gate device wherein film advancement and positioning is controlled by pull down and registration pins mounted on a shuttle arm which swings in one direction to project the pull down pins into film sprocket holes while withdrawing the registration pins for film advancement, and which swings in the opposite direction to project the registration pins into the film sprocket holes while withdrawing the pull down pins for fine positioning of the film. Liquid immersion arrangements for the film passing through the device are also described.

15 Claims, 12 Drawing Figures

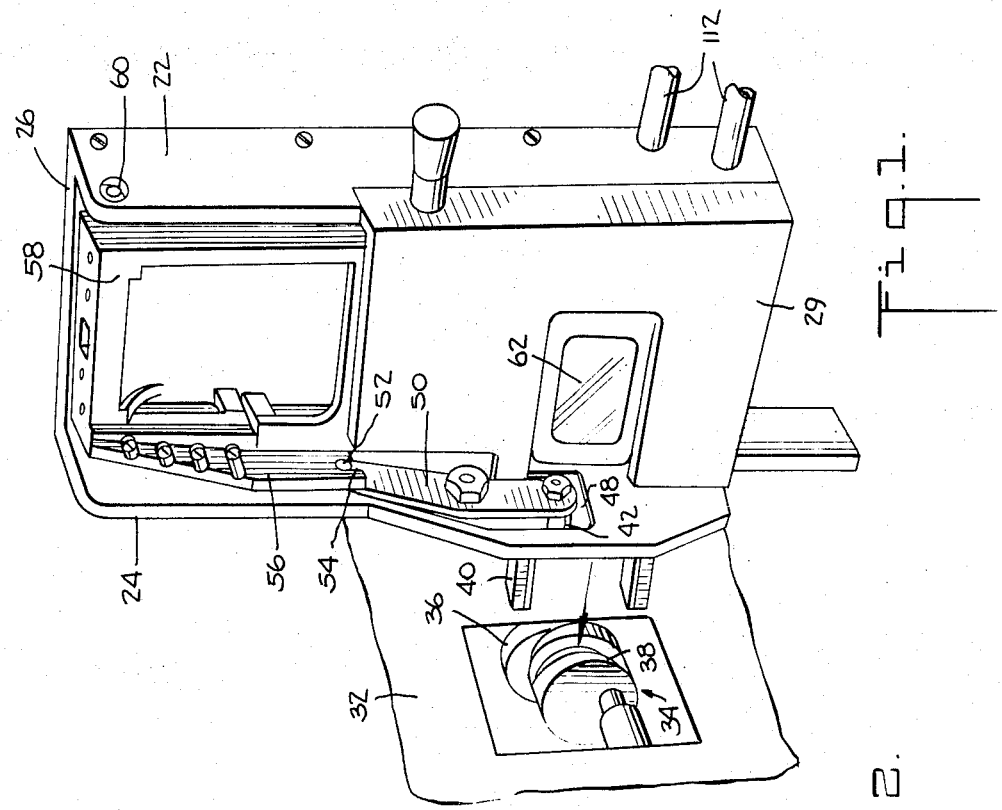
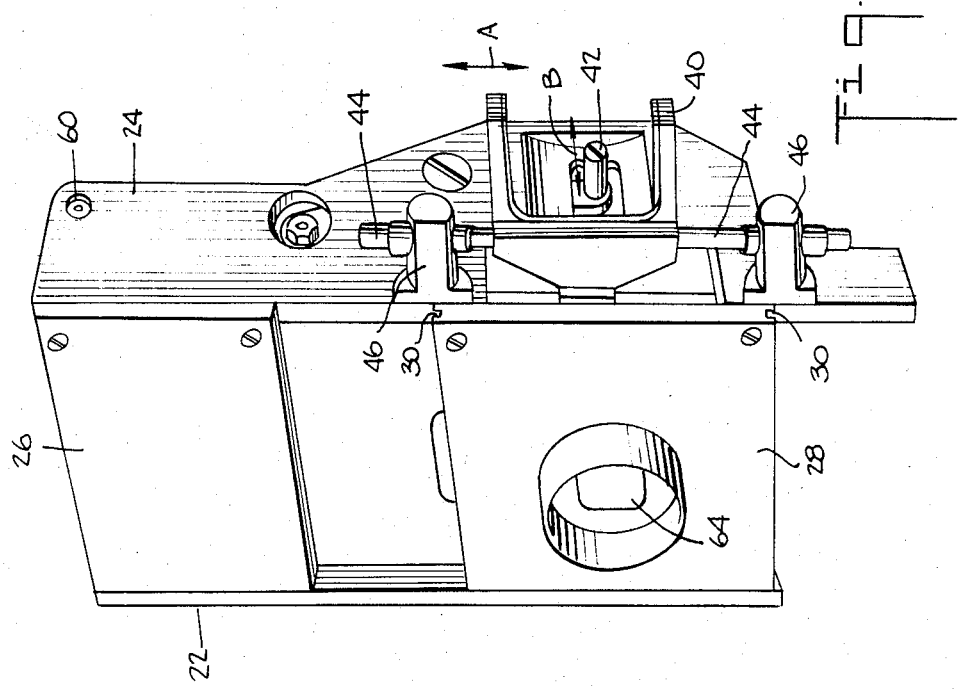

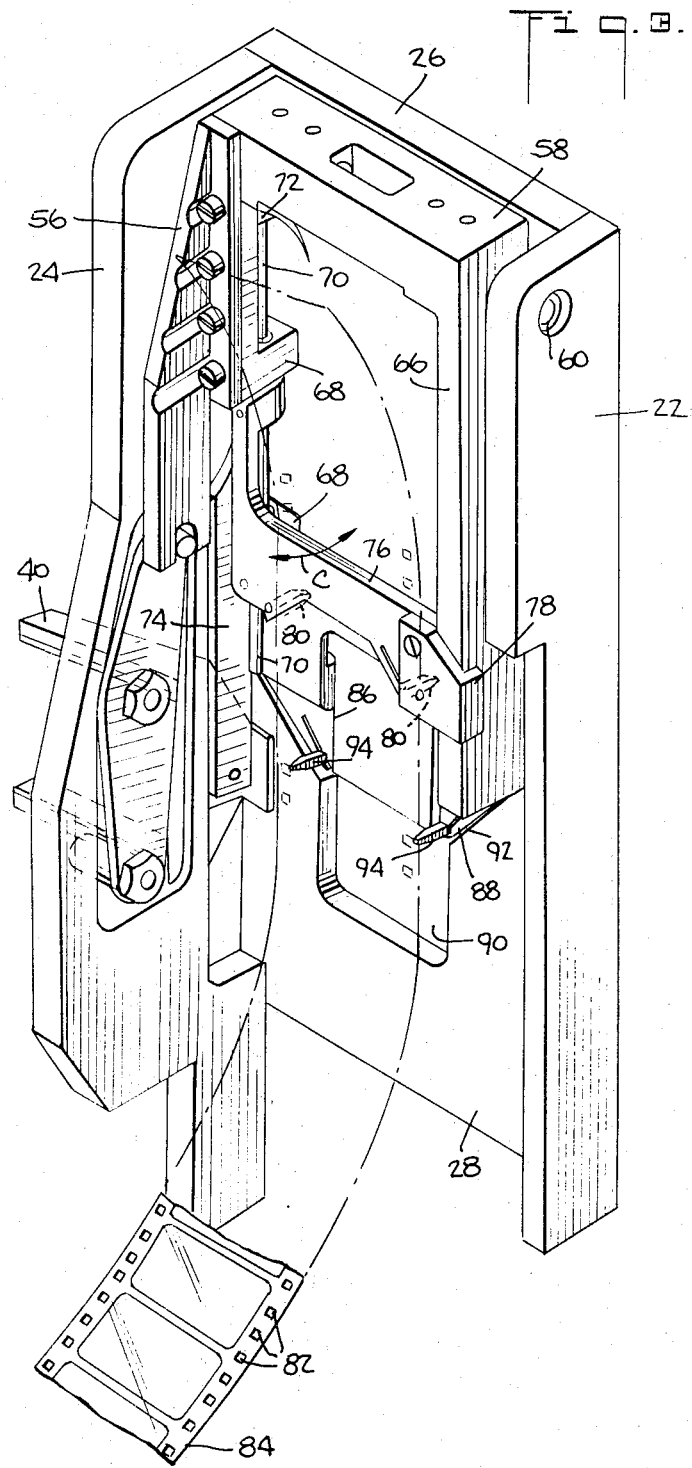

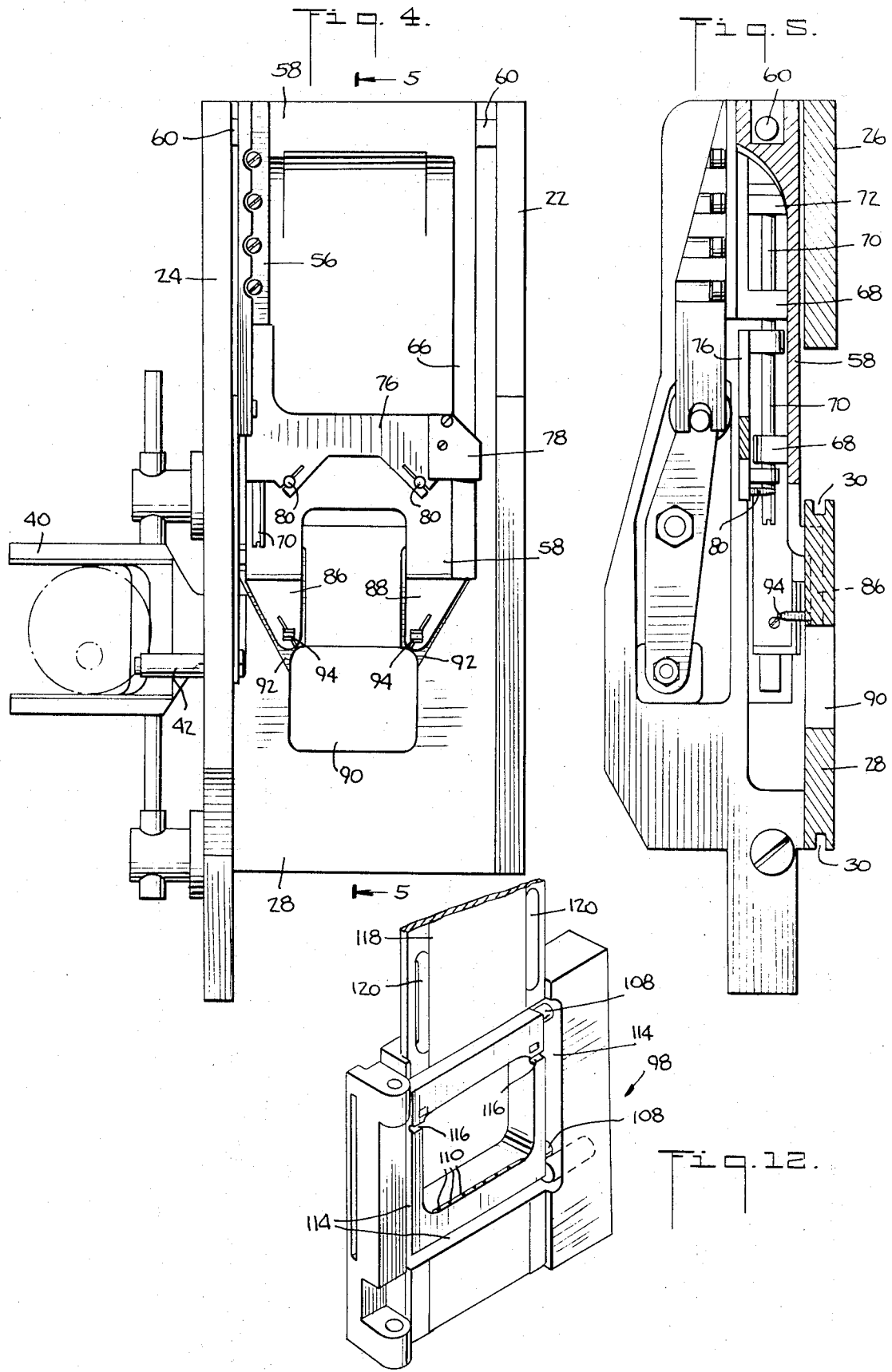

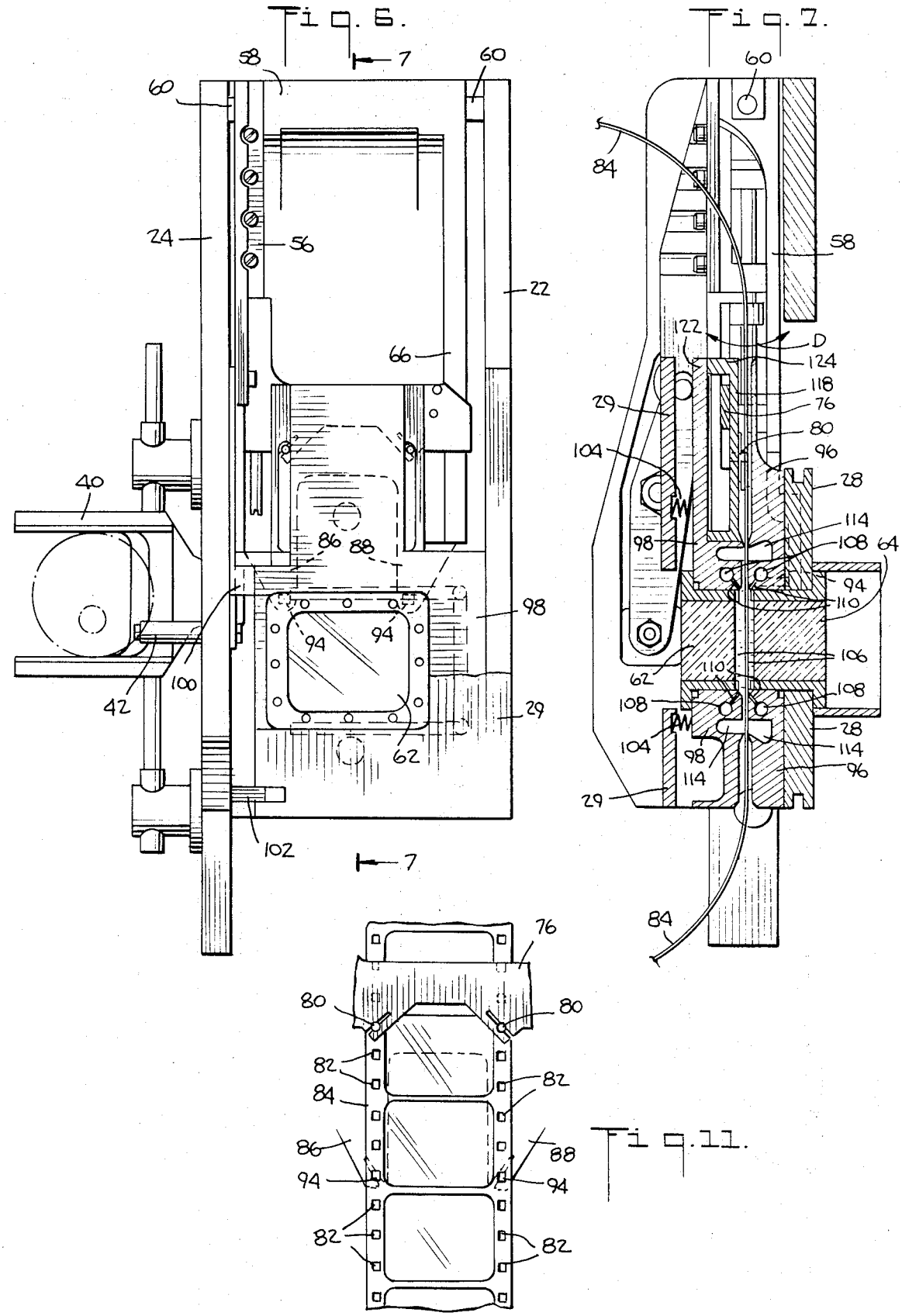

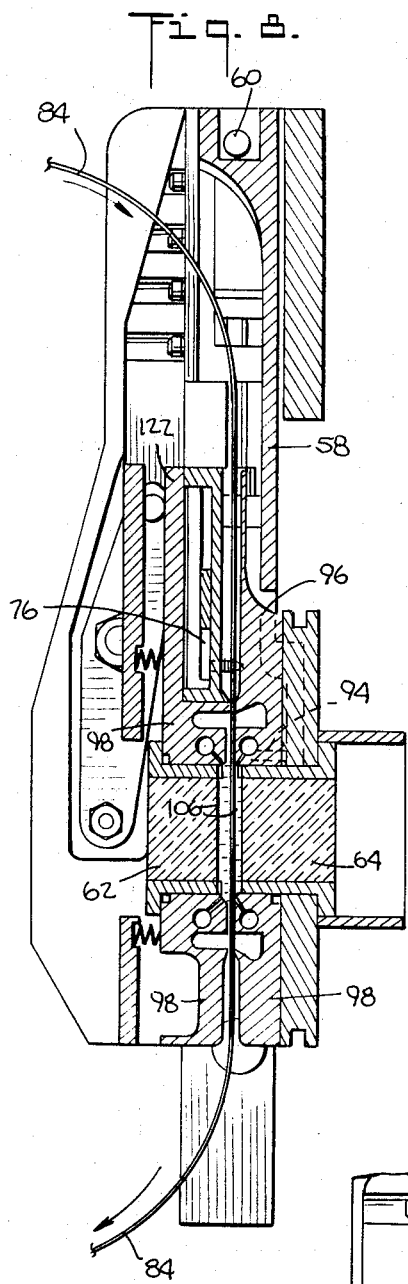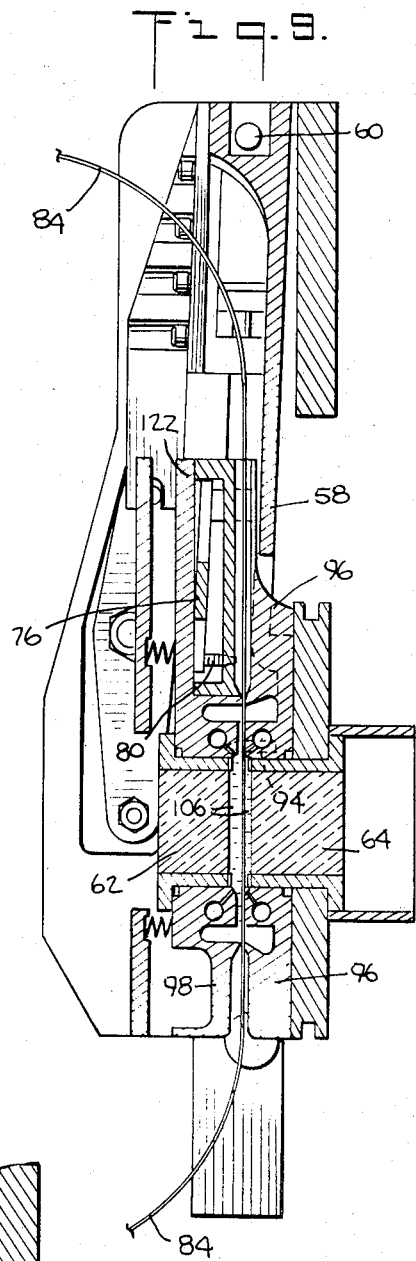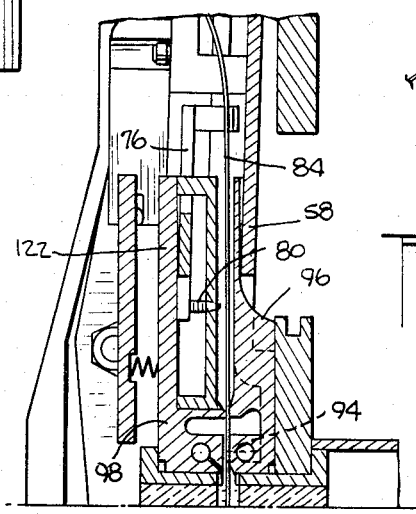

FILM ADVANCING AND POSITIONING APPARATUS

This invention relates to the processing of film strips and more particularly, it concerns novel film advancement and positioning systems as well as novel liquid immersion arrangements for obtaining accuracy and high quality processing.

While the various aspects of the present invention are readily adaptable to numerous applications, as will be apparent to those skilled in the art, the best mode presently comtemplated by the inventor for carrying out this invention involves a film advance and positioning system for optical gate devices.

Optical gate devices are used, generally, to make copies of motion picture film strips. In this operation, the successive frames of both a master film and a copy film are advanced through associated optical gate devices which are mounted on a common light path. As each frame of the master film is brought into alignment with a corresponding frame of the copy film, the image from the master film is projected onto the copy film. It is important that the spacing between the successive frames of the copy film be precisely registered with respect to that of the master film so that unnatural jerkiness and uneven motion will not result when the copy film is projected onto a screen for viewing. It is also important that each frame of the copy film and the master film be maintained in fixed planes along the path of projected light, otherwise the sharpness of focus will be effected. Also, movement of the plane of either the copy film or the master film light path from frame-to-frame may result in a "breathing" effect whereby the image projected on a screen from the copy film will change in sharpness, size or brightness.

Several types of film advancement and positioning mechanisms for use in optical gates have been proposed in the prior art. In general, these mechanisms involve the use of registration pins which are held by bushings for longitudinal sliding movement into and out of corresponding sprocket holes in the film. These pins are tapered up to a precisely formed size and configuration; and as they move forwardly into the film sprocket holes, they fill the holes and establish the lateral positioning of the film. A film registration system of this type is shown in U.S. Pat. No. 2,418,943.

Difficulties have been experienced with prior art sliding pin film registration devices in that the pin must initially be made slightly smaller than the bushing in which it slides in order to obtain a smooth and free sliding action. The relative longitudinal movement, however, produces a wearing away of the bushing material. This, in turn, increases the looseness of fit of the registration pin with consequent loss of registration accuracy. The increased looseness also increases the wearing action which further reduces registration accuracy.

It has also been proposed to provide fixed registration pins which are not subject to wear from sliding action in guide bushings. The use of fixed registration pins, however, suffers from the disadvantage of requiring movement of the film plane along the optical or light projection axis. This arrangement, however, is subject to previously-described "breathing" effects. Also, it requires flexing of the film which, in some circumstances, can be detrimental to the film structure.

The present invention makes possible an improved film strip positioning and registration which is not subject to the above-described difficulties of the prior art.

The film positioning and registration obtained through the present invention ensures the precise positioning of each frame of a flim strip along the optical axis or light path of an optical gate device. Moreover, with the present invention, the accuracy of film positioning is not subject to the wearing effects of longitudinal sliding movements. The "breathing" problem described above in connection with prior art film advancement and registration systems, is avoided with the present invention because, with the present invention, the film strip is advanced along a film path firmly maintained and positively defined by special guide elements. It is possible, as will be seen hereinafter, to maintain each frame of the film strip in liquid immersion during exposure in the optical gate device, and novel arrangements for effecting liquid immersion are shown and described herein.

According to the present invention, the film is held by guide means which define a path of film movement past an optical or light path. An arm, having a registration pin projecting therefrom toward the path of film movement, is also provided. A pivotal interconnection between the arm and the guide means is located near the plane of the path of film movement, but displaced substantially from the optical path. Relative pivotal movement between the arm and the guide means brings the registration pin into and out of engagement with sprocket holes in the film at a location near the optical axis. Because of the distance between the pivotal interconnection and from the registration pin, the pivot movements are amplified so that, for a given amount of registration pin movement, the amount of actual pivoting movement is minimized. This distance also cause a conversion of the swinging motion to essentially linear movement along the length of the registration pin.

In the illustrative embodiment, the film guide means is fixed and the pin carrying arm swings. This arm, referred to as a "shuttle arm," carries on it a transverse member on which pull down or film advance pins are mounted. These pins are arranged to engage sprocket holes in the film and to advance the film as the transverse member is moved. The film path passes between the transverse member and the shuttle arm; and the pull down and registration pins on these two members project toward the film path from opposite sides thereof. As the shuttle arm swings, the pins, both on it and on the transverse member carried by it, move simultaneously in the same direction. Thus, as the shuttle arm swings to one position, the pull down pins move into the film sprocket holes while the registration pins are withdrawn. Thereafter, as the shuttle arm swings to another position, the reverse takes place. By proper coordination of the swinging movement of the shuttle arm with the up and down movement of the transverse member, the advancement of the film by the pull down pins can be made to occur in either direction along the path of film movement and the precise or fine positioning of the film can be made to occur following each advancement operation.

According to other aspects of the present invention, novel liquid immersion arrangements are provided whereby the film strip is passed between a pair of guide plates which are formed with liquid supply and vacuum channels. The vacuum channels are exposed to the film and they extend along the sides of and below the film frame positioned along the light path. This serves to prevent leakage of liquid from below or laterally of the guide plates. The guide plates, themselves, in combination with gravity, prevent upward leakage. Also, the guide plates are provided with optical windows along the light path; and these windows, which have optically flat and parallel surfaces, are positioned so that a substantial distance, e.g., 0.300 inches, exists between their optically flat surfaces and the corresponding facing surfaces of the film. With this arrangement, any mark or irregularities in or on the surfaces of the optical windows are held out of focus relative to the plane of the film and, therefore, are not seen either during projection or copying.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein:

FIG. 1 is a front perspective view of an optical gate device in which the present invention is embodied;

FIG. 2 is a rear perspective view of the optical gate device of FIG. 1;

FIG. 3 is an enlarged perspective view similar to FIG. 2, but showing the device with a cover and internal guide elements removed to illustrate film movement through the device;

FIG. 4 is a rear elevational view of the gate device shown in FIG. 3;

FIG. 5 is a section view taken along line 5—5 of FIG. 4;

FIG. 6 is a view similar to FIG. 4, but showing the device with film guide, liquid immersion and optical elements in place;

FIG. 7 is a section view taken along line 7—7 of FIG. 6, and showing the device at the initiation of a film advance operation;

FIG. 8 is a view similar to FIG. 7, but showing the device at the completion of a film advance operation;

FIG. 9 is a view similar to FIG. 8, but showing the device during a film registration operation;

FIG. 10 is a fragmentary view similar to FIG. 9, but showing the device during resetting for a subsequent film advance operation;

FIG. 11 is an enlarged fragmentary view illustrating positional relationships between film sprocket holes, film advancement pins and film registration pins in the optical gate device of FIGS. 1–10; and FIG. 12 is a perspective view showing a film guide and liquid immersion element of the optical gate device of FIGS. 1–10.

As can be seen in FIGS. 1 and 2, the optical gate device in which the present invention is illustratively embodied is of generally rectangular box-like configuration and is made up of plate-like front and back walls 20 and 22 maintained in spaced apart parallel relationship along one edge by means of an upper base plate 26 and a lower base plate 28 (FIG. 2); and along the opposite edge by means of a cover 29 (FIG. 1). As can be seen in FIG. 2, the lower base plate is formed with mounting grooves 30 along its upper and lower edges. These grooves accommodate mounting plates (not shown) on a projection machine 32 (FIG. 1), which may be, for example, a film copying device. As can be seen in FIG. 1, the projection machine 32 includes a double action rotary cam 34. This cam has an eccentric portion 36, which provides movement transverse to its axis of rotation, and a cam slot portion 38 which provides synchronized movement longitudinally of its axis of rotation. The optical gate device contains a fork 40 which spans the eccentric portion 36, and a follower stud 42 which fits into the slot portion 38 when the gate device is fitted onto the projection machine 32. It will be appreciated that as the projection machine cam 34 turns, the fork 40 will move up and down, as indicated by the arrow A in FIG. 2, while the follower stud 42 moves back and forth, as indicated by the arrow B. The double action rotary cam 34 is designed, for reasons which will be explained hereinafter, to cause the back and forth movements of the follower stud 42 while the fork 40 is at its uppermost and lowermost positions, respectively.

The fork 40, as shown in FIG. 2, is provided with a guide shaft 44 which extends outwardly from the base of the fork in the direction of fork movement. The guide shaft 44 passes through pillow blocks 46 mounted on the back wall 24; and this serves to mount the fork on the optical gate device while allowing it to move freely in an up and down direction. The base of the fork 40, as is shown and described more fully hereinafter, is connected to a transverse member which produces film advancement through the optical gate device.

The follower stud 42, as shown in FIG. 1, extends through an opening 48 in the back wall 24 and is secured to one end of a rocker arm 50 pivotally mounted at its center to the inside surface of the back wall. A connecting stud 52 at the opposite end of the rocker arm engages a groove 54 in a swing arm 56. The swing arm is mounted on and forms an extension of a shuttle arm 58. The shuttle arm is mounted in preloaded end thrust bearings 60 to pivot between the front and back walls 22 and 24 near their upper end. As can be seen in FIG. 1, the shuttle arm 58 extends down inside the cover 29 and sufficient clearance is provided by the cover to allow a small but finite swinging movement of the shuttle arm 58. This swinging movement, it will be noted, is caused by the back and forth movement of the follower stud 42 which pivots the rocker arm which, in turn, communicates this movement through the connecting stud 52 and groove 54 in the swing arm 56 to the shuttle arm 58. This back and forth swinging movement serves to engage and disengage advancement and registration pins within the device with respect to film sprocket holes. This engagement and disengagement is coordinated with the transverse member up and down movement to effect film advancement in a given direction and accurate film positioning following each advancement movement.

The cover 29 is provided with an optical input window 62 through which light is admitted to the gate device from a light source (not shown) on the projection machine 32. This light is intercepted and modified in accordance with an image on a frame of a film strip (not shown) in the machine and this modified light is then emitted via an optical output window 64 on the lower base plate 28. This light image thus-formed may be projected onto a screen for viewing or it may be projected onto an unexposed film for copying purposes. In the case of film copying, the unexposed film is held in an optical gate device which may be identical to the device described herein.

The construction and arrangement of the film advancement and registration components within the optical gate is best seen in FIGS. 3, 4 and 5. The shuttle arm 58, as can be seen in these figures, is of maximum thickness at its upper end where it is pivotally mounted, by means of the thrust bearings 60 to the front and back walls 22 and 24. The central portion of the shuttle arm 58 curves inwardly toward the upper and lower base plates 26 and 28 to define a path of film movement into the device. The edge of the shuttle arm remote from the fork 40 and the follower stud 42 is formed with an upstanding wall 66 (FIGS. 3 and 4). The opposite longitudinal edge of the shuttle arm 58, to which the swing arm 56 is mounted, is formed with a pair of guide studs 68 (FIGS. 3 and 5) having aligned openings through which a traverse member driving shaft 70 extends. The driving shaft is movable both axially and rotatably in the guide studs 68; and, of course, the drive shaft moves correspondingly as the shuttle arm 58 pivots.

The upper end of the driving shaft 70 is pivotally connected by means of a lock nut arrangement 72 to the upper end of an impeller arm 74 (FIG. 3). The lower end of the impeller arm is connected to the base of the fork 40. This arrangement permits the reciprocal up and down movements of the fork to be transmitted through the impeller arm 74 and the pivotally connected lock nut arrangement 72 to the driving shaft 70 independently of the swinging action of the shuttle arm 58.

A transverse member 76 extends across the shuttle arm 58 between the upstanding wall 66 and the driving shaft 70. This transverse member is secured to the driving shaft on the one side and is releasably secured to, but slideable longitudinally of the upstanding wall 66. Thus, as the driving shaft 70 is moved up and down under the influence of the fork 40, it causes the transverse member 76 to move up and down correspondingly along the shuttle arm 58. A bearing latch 78 on the end of the transverse member 76 releasably engages the upstanding wall 66 of the shuttle arm. When the latch is released, the transverse member may pivot with rotation of the driving shaft, as indicated by the arrow C, to expose the interior of the shuttle arm for removal and replacement of a film strip in the space enclosed by the shuttle arm and the transverse member.

A pair of film pull down pins 80 are mounted on the transverse member 76; and these extend inwardly toward the shuttle arm 58, as can be seen in FIG. 5. It will be appreciated that, as the transverse member moves up and down under the influence of the cam operated fork 40, the pull down pins 80 also move up and down. Also, as the shuttle arm 58 swings back and forth under the influence of the cam operated follower stud 42, the pull down pins 80 also move back and forth into and out of engagement with sprocket holes 82 in a film strip 84 which passes through the device.

The lower extremity of the shuttle arm 58 is bifurcated to form two extensions 86 and 88 which straddle a central opening 90 in the lower base plate 28. The two extensions 86 and 88 are depressed to fit into recesses 92 (FIG. 4) in the lower base plate 28.

A pair of registration pins 94 are mounted near the tips of the extensions 86 and 88; and these pins extend back in the direction of the transverse member 76, as shown in FIG. 5. The registration pins 94 do not move up and down, byt they do move back and forth with the swinging movements of the shuttle arm 58 produced by the action of the cam operated follower stud 42. During such movement, these pins also move into and out of engagement with the sprocket holes 82 of the film strip 84 near the optical windows 62 and 64.

FIGS. 6 and 7 illustrate the film guide and liquid immersion arrangements within the optical gate device. As can be seen in FIG. 7, the film strip 84 enters the device from the top thereof and follows a film path down through the device and exits from the bottom thereof. During this passage, the film is engaged and guided on one side by a fixed guide plate 96, and on the other side by a pressure plate 98. The fixed guide plate is secured to the lower base plate 28. The pressure plate 98 is hingedly connected to the cover 29 at pivot points 100 and 102. The film strip 84 may be positioned along the fixed guide plate 96 when the pressure plate 98 is swung to an open position and then the pressure plate may be closed on top of the film. When the cover 29 of the optical gate device is secured in place, a number of compression springs 104 extend from it to the pressure plate 78 to urge it resiliently against the film strip 84 and the fixed guide plate 96. Although in FIG. 7 a finite clearance is seen between the fixed guide plate 96 and the pressure plate 98, it is to be understood that this clearance occurs only in the center of the film strip 84, and that along its edges, in the vicinity of the sprocket holes 82, it is actually engaged by the plates 96 and 98 squeezing together under the force of the compression springs 104.

Both the fixed plate 96 and the pressure plate 98 have optical openings in alignment with optical input window 62 of the cover 29 and the optical output window 64 of the lower base plate 28. As can be seen in FIG. 7, these openings actually accommodate the optical windows and the windows, in turn, serve to define an optical or light path which is perpendicular to the direction of film movement.

It will be noted that the optical windows 62 and 64 are spaced apart from the film strip 84 by a substantial distance on each side thereof; and that the spaces between the windows and the film are filled with a liquid 106. This liquid is chosen to have a high degree of transparency and to have a light refractive index close to that of the film itself. This serves to mask the scattering effects of any scratches which may be present on the film surface. The general idea of using a liquid coating on the surfaces of a film for this purpose is well known and is described in both patents, e.g., U. S. Pat. Nos. 3,614,223 and 3,473,874, and in the technical literature, e.g., articles in the Journal of the SMPTE (Society of Motion Picture and Television Engineers), Vol. 66, pages 607, et seq., Oct. 1957, Vol. 71, pages 100 et seq., February 1962 and Vol. 79, pages 333 et seq., April 1970. The arrangements shown and described herein differ from the arrangements shown in those patents and literature in the manner of achieving film advancement and registration, and in the manner of controlling liquid flow to and from the film surfaces.

The fixed plate 96 and the pressure plate 98 are both made of wear resistant low friction non-abrasive plastic material, such as an acetyl polymer. One such material is sold under the mark DELRIN. Each of the plates 96 and 98 is provided with two circularly cross-sectioned liquid supply manifolds 108 which extend horizontally through the plate, respectively, above and below the optical windows 62 and 64. A series of metering ports 110 extend from the manifolds 108 to the inner edges of the optical openings. The exits from the ports 110 can be seen in the perspective view of the pressure plate 98 shown in FIG. 12. The manifolds 108 are connected to liquid supply conduits 112 (FIG. 1) which enter the device through the front wall 22 and through the cover 29 and a continuous flow of liquid from an external source (not shown) is supplied through the conduits 112, the manifolds 108 and the metering ports 110 to the spaces between the surfaces of the film strip 84 and the corresponding glass surface of the optical windows 62 and 64. The liquid, it will be noted, flows into these spaces from both above and below the particular frame of the film which is positioned in the optical light path defined by the windows.

A vacuum manifold 114 is formed into both the fixed plate 96 and the pressure plate 98. This manifold is in the form of a channel which opens to the mutually inwardly facing surfaces of the plates. As can be seen in FIG. 7, the vacuum manifold 114 extends vertically along both sides of the optical openings and horizontally below the lower liquid supply manifolds 108. The vacuum manifold in each of the plates 96 and 98 is connected to an external source of vacuum (not shown). A pair of bleeder channels 116 are cut into the pressure plate inner surface from regions near the top of the optical aperture out to the vacuum manifold 114. Similar bleeder channels (not shown) are provided in the fixed plate 96. These bleeder channels serve to prevent entrapment and accumulation of air in the spaces between the film surfaces and the corresponding glass surfaces of the optical windows 62 and 64.

The pressure plate 98, as can be seen in FIG. 12, has an upper section 118 into which a pair of spaced apart vertical slots 120 are formed. These slots accommodate the pull down pins 80 which extend from the transverse member 76, through the slots and into a film channel formed between the fixed plate 96 and the pressure plate 98. It will be noted from FIG. 7 that the upper section 118 of the pressure plate 98 extends under the transverse member 76. A pressure section 122 (FIG. 7) extends up from the main body of the pressure plate 98 over the transverse member 76 and is connected at its upper end via an upper flange 124 to the upper end of the upper section 118. With this construction, the transverse member is provided with sufficient clearance to move freely up and down and to swing back and forth with the swinging of the shuttle arm 58 and, at the same time, the pressure plate 98 is continuously urged firmly against the fixed plate 96 by the action of the compression springs 104. It will be appreciated that the film path defined by the plates 96 and 98 is maintained in a firmly fixed position at all times and the film is positively restrained from any movement at all in a direction along the light path in spite of the fact that substantial liquid spaces are provided between the frame region of the film and the glass surfaces of the optical windows 62 and 64. These spaces are each in the amount of about 0.300 inches from the film surface to the glass surface of the corresponding optical window. This rather large clearance, which results in a correspondingly thick liquid lens on each side of the film in the optical path, serves to maintain the glass frame in the optical path at a position where they are out of focus with respect to the film itself. Thus, the effects of any irregularities or markings on the glass surfaces are minimized during projection and/or copying of the film. In addition, the optically flat and rather soft surfaces of the ultra clear glass windows is protected from scratching and from light interference effects.

The operation of the above-described optical gate device in advancing, registering and maintaining liquid immersion of a film strip is illustrated in sequence in FIGS. 7 through 10. As indicated above, the film strip 84 is guided by the fixed plate 96 and the pressure plate 98 to move along a fixed path vertically through the device. Two distinct mechanical movements take place within the device to effect this film movement. First the shuttle arm 58, and with it the transverse member 76, swing back and forth in the direction of the arrow D (FIG. 7) as the shuttle arm pivots slightly about the thrust bearings 60 in response to the previously-described action of the slot portion 38 of the double action rotary cam 34 (FIG. 1). Secondly, the transverse member 76 moves up and down along the shuttle arm 58, in the direction of the arrow E (FIG. 7), in response to the previously-described action of the eccentric portion 36 of the double action rotary cam 36. These two movements are coordinated, by virtue of the cam construction, such that the transverse member is first moved downwardly from the position shown in FIG. 7 to the position shown in FIG. 8, while the shuttle arm is in its forwardmost position, i.e., swung to the right as viewed in FIGS. 7 and 8. Then with transverse member 76 in its lowermost position, as seen in FIG. 8, the shuttle arm is swung to its rearwardmost position, i.e., to the left, as shown in FIG. 9. The transverse member 76 is then moved upwardly from the position shown in FIG. 9, to the position shown in FIG. 10, while the shuttle arm 58 remains in its rearwardmost position. The shuttle arm is then swung forwardly to the position shown in FIG. 7 to complete the cycle of movement.

Turning now to FIG. 11, it will be noted that the pull down pins 80 on the transverse member 76 and the registration pins 94 on the lower end extensions 86 and 88 of the shuttle arm 58 are positioned along the paths of movement of the sprocket holes 82 of the film strip 84. The pull down pins 80 are shaped to fit rather loosely into the sprocket holes 84. However, at least one of the registration pins 94 is hardened and is tapered to a very precisely controlled cross-sectional size and configuration which matches the dimensions of the sprocket holes 82 with which it is aligned. As the registration pins 94 enter the sprocket holes, the closeness of fit experienced by the sprocket holes 82 results in a fine positioning correction for the film strip 84 to insure that the particular frame thereof which is in the optical path is very precisely positioned.

Reverting again to FIGS. 7-10, it will be seen that as the shuttle arm 58 swings back and forth, both the pull down pins 80 and the registration pins 94, which are mounted on elements extending along opposite sides of the fixed film path, are also moved back and forth in the direction of the arrow D. Also, when the shuttle arm 58 is in its forwardmost position, as shown in FIGS. 7 and 8, the pull down or film advance pins on the transverse member 76 engage the film strip sprocket holes 82 for advancing or pulling the film strip 84 down while, at the same time, the registration pins are pulled out and disengaged from the sprocket holes 82, and so do not interfere with the pull down action. Thereafter, when the shuttle arm 58 is swung back to the left, as shown in FIGS. 9 and 10, the pull down pins 80 are disengaged from their sprocket holes in the film strip 84 while the registration pins 94 enter other sprocket holes to provide a final fine positioning of the film.

The final fine positioning of the film by the registration pins 94 is made possible not only because of their precisely controlled size and configuration, but also because they are fixedly mounted on the shuttle arm 58. The shuttle arm is of rather massive construction and is, therefore, not subject to distortions or deflections. Also, the shuttle arm is connected to the device for pivotal movement; and it converts this pivotal movement, by means of a long swing arm distance, to essentially linear back and forth movement of the registration pins 94. Because of the long swing arm distance, the amount of angular or pivotal movement is very slight. Also, the registration pin movement is substantially linear, and because the pivot axis of the shuttle arm is near the plane of the film path through the film guide means, the movement of the registration pins 94 is substantially perpendicular to the film. Neither the registration pins 94 nor any other part of the registration mechanism is subjected to axial sliding movement, so that no bushings are required which might otherwise wear and permit position variation.

The thrust bearings 60, as indicated above, undergo very limited rotational movement, and so are not subject to the looseness producing effects which are inherent in guide elements which require axially slideable elements. Moreover, by utilizing thrust bearings, any wear due to continued rotation is automatically accommodated in the relief of end thrust preload on the bearings 60 so that no looseness in a direction perpendicular to the swing axis occurs. Thus, the path of movement of the registration pins 94 remains precisely fixed.

It will be seen from the foregoing that when the sprocket holes 82 of the film strip 84 are engaged by the pull down pins 80, as shown in FIG. 7, and the pins are moved downwardly, as shown in FIG. 8, the film strip 84 is pulled downwardly so that a new frame is brought into position along the optical path. Thereafter, the pull down pins 80 are withdrawn and simultaneously the registration pins 94 are engaged in associated sprocket holes 82, as shown in FIG. 9, to obtain the above-described fine positioning of the film strip so that the particular frame in the optical path is precisely positioned both vertically and laterally. At this point, the light from an external source (not shown) is transmitted along the optical path to expose the film for copying or viewing. During this time, the pull down pins are moved upwardly by the transverse member 76, as shown in FIG. 10, so that they may thereafter be brought into engagement with another set of sprocket holes 82 for further pull down or advancement of the film.

During the above-described film advancement and positioning, liquid is continuously supplied to both sides of the film strip 84 in the vicinity of the optical path. The vacuum maintained along the vacuum manifold 114, which extends alongside and below the optical path and the liquid supply on each side of the film, serves to bleed air from the spaces between the film and the optical windows; and it further serves to prevent leakage of liquid laterally and downwardly from the system. Leakage in the upward direction is avoided, irrespective of the direction of film movement, by gravity and by the wiping action of the plates 96 and 98 on the film surfaces. It will be apparent, of course, that this liquid supply and vacuum system will accommodate film movement both downwardly and upwardly through the system. Further, the film advancement and fine positioning or registration mechanism described herein can be accommodated to upward film movement simply by reversing the direction of rotation of the double action cam 34.

Although the invention has been described in connection with fixed film guide means and swinging registration and pull down pin mounting means, it will be appreciated that the movements may be interposed so that the shuttle arm and transverse member are maintained fixed from pivoting while the film guide elements, including the plates 96 and 98, are pivoted about the thrust bearing axis.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed is:

1. Film positioning apparatus comprising an arm mounted for swinging movement alongside a film movement path, a registry pin fixed on said arm and projecting toward said path to swing into and out of said path for engagement with and disengagement from film sprocket holes upon swinging movement of said arm, film advancement means mounted on said arm and including pin-like pulling elements moveable back and forth along the film movement path while alternately engaged with and disengaged from film sprocket holes to advance the film and synchronizing means interconnecting said arm and said film advancement means to effect mutually alternate engagement and disengagement by said registry pin and by said elements, with the sprocket holes of a film extending along said path, said synchronizing means comprising a transverse member mounted to be carried by said arm and guided thereby to be movable longitudinally along said arm said transverse member extending over the film movement path on the side thereof opposite from said arm, said pin-like pulling elements being mounted on said transverse member and projecting toward said path whereby swinging movement of said arm will cause alternate engagement of said registry pin and said pin-like elements with sprocket holes in said film.

2. Film positioning apparatus according to claim 1, wherein said registry pin is tapered.

3. Film positioning apparatus according to claim 1 wherein said arm is rigid and is mounted for said swinging movement by pivot means near the plane of said film movement path.

4. Film positioning apparatus according to claim 3, wherein said pivot means comprises preloaded end thrust bearings.

5. Film positioning apparatus according to claim 3 wherein said pivot means is located a substantial distance from said registry pin.

6. Film positioning apparatus according to claim 1 further including a transverse member driving mechanism comprising a cam follower element movable reciprocally along a fixed path, first and second rod-like elements connected respectively to said cam follower element and to said transverse member, said rod-like elements being pivotally interconnected in the vicinity of the pivot axis of said arm.

7. An optical gate device comprising, fixed wall means, film guide means mounted on said fixed wall means to define a fixed path of movement for a film strip to pass through said device, window means defining an optical path perpendicular to and intersecting said fixed path, a shuttle arm pivotally mounted on said wall means at a location displaced from said optical axis for swinging movement of an extension of said arm on one side of said fixed path in a direction closely adjacent and parallel to said optical path, a registration pin fixedly mounted on said extension and projecting toward said path to engage a sprocket hole in a film passing through said film guide means when said shuttle arm pivots in one direction and to disengage from said sprocket hole when said shuttle arm pivots in the opposite direction, a transverse member mounted on said shuttle arm to be guided thereby for longitudinal movement along said shuttle arm on the other side of said fixed path, film advancement pins on said transverse member and projecting toward said path to engage sprocket holes in said film passing through said film guide means when said shuttle arm pivots in said opposite direction and to disengage from said sprocket holes when said shuttle arm pivots in said one direction.

8. Film positioning apparatus according to claim 7, wherein said arm and said guide means are positioned to maintain said path perpendicular to and intersecting an optical path in their relative angular position corresponding to engagement of said sprocket holes by said registration pin.

9. Film positioning apparatus according to claim 7, wherein said film guide means includes a window forming a portion of means defining said optical path.

10. Film positioning apparatus according to claim 7, wherein said registration pin is positioned to engage said film strip adjacent the location where it intersects said optical axis.

11. An optical gate device according to claim 7 and further including a cam engaging fork mounted for reciprocal movement along said wall means, first and second push rod elements connected respectively to said fork and to said transverse member, said push rod elements being pivotally interconnected at a location near the pivotal mounting of said shuttle arm on said wall means.

12. An optical gate device according to claim 7 further including cam follower means connected to said shuttle arm for producing pivotal movements thereof.

13. An optical gate device according to claim 7, wherein said shuttle arm is pivotally interconnected to said fixed wall means by means of preloaded end thrust bearings.

14. An optical gate device according to claim 7, wherein the surfaces of said window means on each side of said film path are displaced from said fixed path by an amount such that any markings on said window means are out of focus relative to said film path.

15. An optical gate device according to claim 7, wherein the surfaces of said window means are displaced from said fixed path by approximately 0.300 inches.

* * * * *